United States Patent
Chen et al.

(10) Patent No.: US 11,841,743 B2
(45) Date of Patent: Dec. 12, 2023

(54) ELECTRONIC DEVICE

(71) Applicant: Acer Incorporated, New Taipei (TW)

(72) Inventors: Chia-Bo Chen, New Taipei (TW);
Yi-Hsuan Yang, New Taipei (TW);
Chuan-Hua Wang, New Taipei (TW);
Chih-Chun Liu, New Taipei (TW);
Wu-Chen Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 18/180,859

(22) Filed: Mar. 9, 2023

(65) Prior Publication Data

US 2023/0221765 A1    Jul. 13, 2023

Related U.S. Application Data

(63) Continuation of application No. 17/862,411, filed on Jul. 12, 2022, now Pat. No. 11,635,787, which is a continuation of application No. 17/180,883, filed on Feb. 22, 2021, now Pat. No. 11,429,150.

(30) Foreign Application Priority Data

Jul. 2, 2020   (TW) .................................. 109208419

(51) Int. Cl.
*G06F 1/16*   (2006.01)
*E05D 3/06*   (2006.01)
*E05F 1/12*   (2006.01)

(52) U.S. Cl.
CPC .......... *G06F 1/1647* (2013.01); *G06F 1/1662* (2013.01); *G06F 1/1681* (2013.01); *E05D 3/06* (2013.01); *E05F 1/1253* (2013.01); *E05Y 2900/606* (2013.01); *G06F 1/1616* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,627,874 B2 * | 4/2020 | Lin | ....................... | G06F 1/1616 |
| 10,936,020 B2 * | 3/2021 | Chang | .................. | G06F 1/1692 |
| 11,132,026 B2 * | 9/2021 | Yang | ..................... | G06F 1/1647 |
| 11,132,031 B2 * | 9/2021 | Lin | ..................... | G06F 1/1681 |
| 11,226,651 B2 * | 1/2022 | Chen | ....................... | G06F 1/165 |
| 11,262,801 B2 * | 3/2022 | Huang | .................. | G06F 1/1641 |
| 11,379,006 B2 * | 7/2022 | Yang | ..................... | G06F 1/1681 |
| 11,429,150 B2 * | 8/2022 | Chen | ..................... | G06F 1/1647 |
| 11,573,598 B2 * | 2/2023 | Chen | ..................... | G06F 1/1649 |
| 11,573,611 B2 * | 2/2023 | Channaiah | ............ | G06F 1/1681 |
| 11,635,787 B2 * | 4/2023 | Chen | ..................... | G06F 1/1681 361/104 |
| 11,703,909 B2 * | 7/2023 | Wen | ..................... | G06F 1/1688 345/168 |
| 2020/0241603 A1 * | 7/2020 | Lin | ..................... | G06F 1/1662 |
| 2021/0286404 A1 * | 9/2021 | Huang | .................. | G06F 1/1624 |
| 2021/0333840 A1 * | 10/2021 | Channaiah | ............ | G06F 1/1681 |

(Continued)

*Primary Examiner* — Lisa Lea-Edmonds
(74) *Attorney, Agent, or Firm* — JCIPRNET

(57) ABSTRACT

An electronic device, including a host, a main display, an auxiliary display, and a lifting mechanism, is provided. The main display is pivoted to the host. The auxiliary display is disposed on the host. The lifting mechanism is disposed between the auxiliary display and the host. The lifting mechanism is configured to lift the auxiliary display and maintain a lifting height of the auxiliary display.

10 Claims, 7 Drawing Sheets

(56) References Cited

U.S. PATENT DOCUMENTS

| | | | |
|---|---|---|---|
| 2022/0004226 A1* | 1/2022 | Yang | G06F 1/1681 |
| 2022/0004227 A1* | 1/2022 | Chen | G06F 1/1662 |
| 2022/0342447 A1* | 10/2022 | Chen | G06F 1/1681 |
| 2023/0139383 A1* | 5/2023 | Chen | G06F 1/1624 |
| | | | 361/679.01 |

* cited by examiner

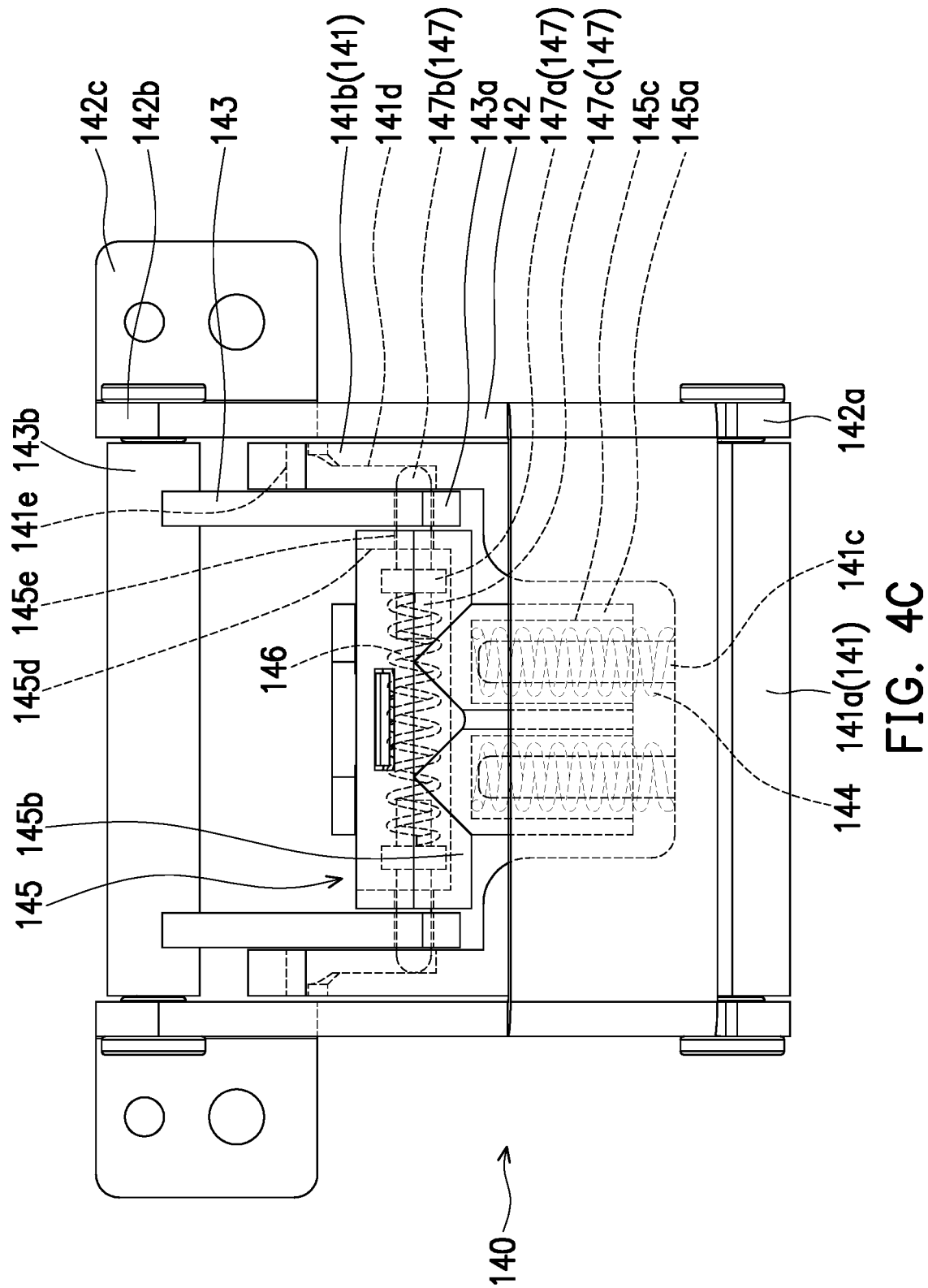

ical application serial no. 109208419, filed on Jul. 2, 2020. The entirety of each of the above-mentioned patent applications is hereby incorporated by reference herein and made a part of this specification.

BACKGROUND OF THE INVENTION

1. Field of the Invention

The disclosure relates to an electronic device, and in particular, to an electronic device including a main display and an auxiliary display.

2. Description of Related Art

Notebook computers have become indispensable tools for modern people due to features of multi-task processing, high computing efficiency, and being easy to carry, and the like. Generally, a notebook computer includes a host and a display, where the display is pivoted to the host, and a keyboard is integrated on the host.

To improve operation flexibility of a user, a notebook computer in which an auxiliary display is integrated on the host has been proposed at present. Specifically, the auxiliary display and the keyboard are located in the same working plane, and the auxiliary display and the keyboard are disposed in parallel. Because the angle and the height of most auxiliary displays cannot be adjusted, the auxiliary display is inconvenient to operate for a user, and eyestrain is easily caused. In addition, although an auxiliary display with the adjustable angle and height has been proposed, a lifting mechanism of the auxiliary display is linked to an unfolding mechanism of the main display, and individual and independent operation cannot be performed, lacking operation flexibility.

SUMMARY OF THE INVENTION

The disclosure provides an electronic device, which has excellent operation flexibility.

The disclosure provides an electronic device, including a host, a main display, an auxiliary display, and a lifting mechanism. The main display is pivoted to the host, and the auxiliary display is disposed on the host. The lifting mechanism is disposed between the auxiliary display and the host, and the auxiliary display is connected to the host through the lifting mechanism. The lifting mechanism includes a first bracket, a driving member, a first spring, a second spring, a positioning member, a second bracket, and a third bracket. The first bracket is fixed to the host. The driving member is slidably disposed on the host. Two ends of the first spring are respectively in contact with the first bracket and the driving member. The second spring is disposed in the positioning portion. The positioning member is slidably disposed on the driving member, and two ends of the positioning member are respectively in contact with the second spring and the first bracket. Two ends of the second bracket are respectively pivoted to the first bracket and fixed to the auxiliary display. Two ends of the third bracket are respectively pivoted to the positioning member and the second bracket.

Based on the foregoing, the electronic device of the disclosure integrates the auxiliary display, where the angle and the height of the auxiliary display are adjustable, to help a user operate the auxiliary display, and improve comfort of the user watching the auxiliary display. In addition, a lifting mechanism of the auxiliary display is not linked to an unfolding mechanism of the main display. That is, the lifting mechanism of the auxiliary display and the unfolding mechanism of the main display run individually and independently. After the main display is unfolded relative to the host, the user actuates the lifting mechanism of the auxiliary display according to personal requirements, to drive, through the lifting mechanism, the auxiliary display to rotate and lift relative to the host. Therefore, the electronic device has excellent operation flexibility.

To make the foregoing features and advantages of the disclosure more apparent and easier to understand, the following provides a detailed description by listing embodiments with reference to the accompanying drawings.

BRIEF DESCRIPTION OF THE DRAWINGS

FIG. 4C is a schematic top view of the lifting mechanism of FIG. 4A.

DESCRIPTION OF THE EMBODIMENTS

Figure 1:
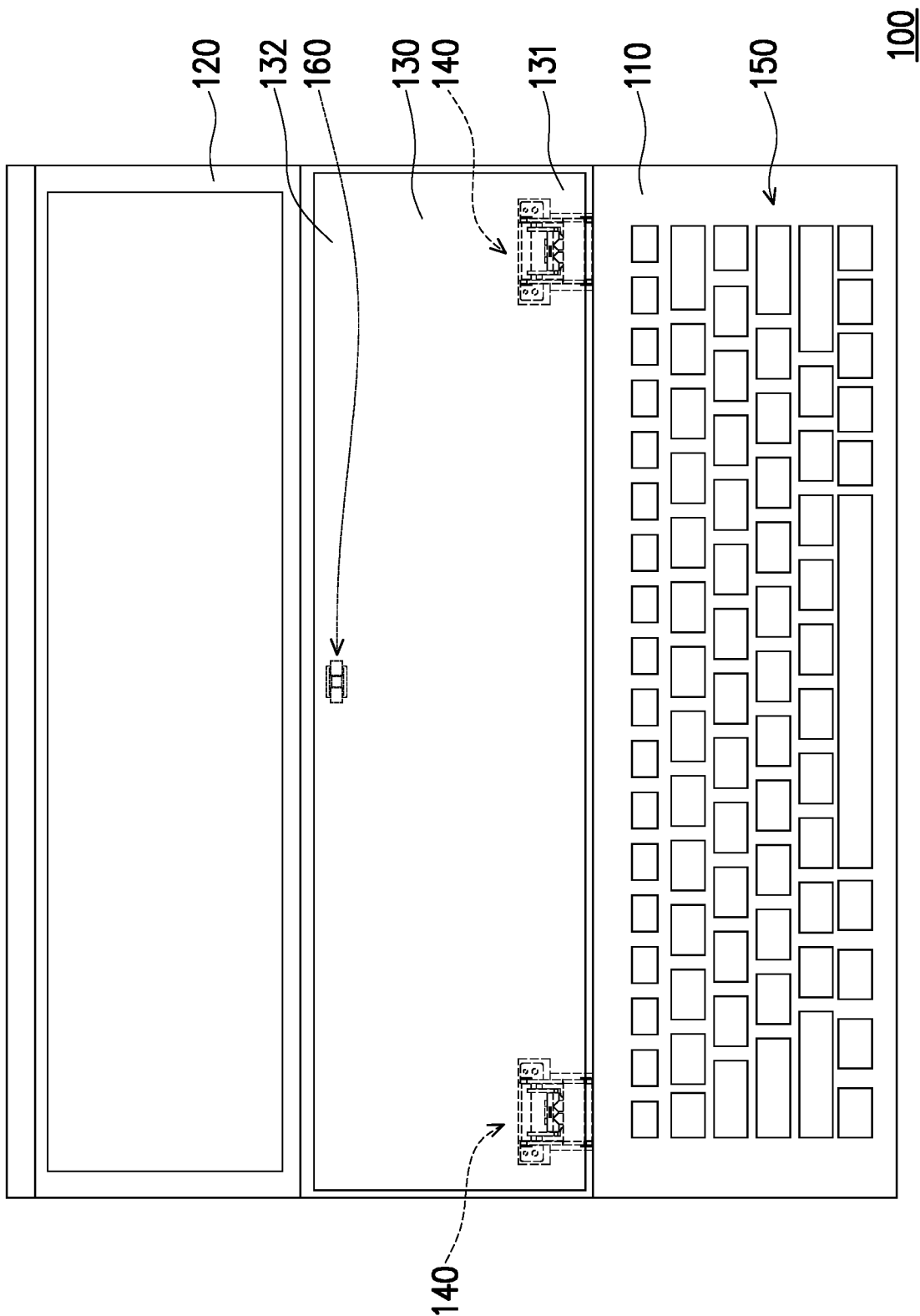
FIG. 1 is a schematic top view of an electronic device according to an embodiment of the disclosure.
Figure 2:
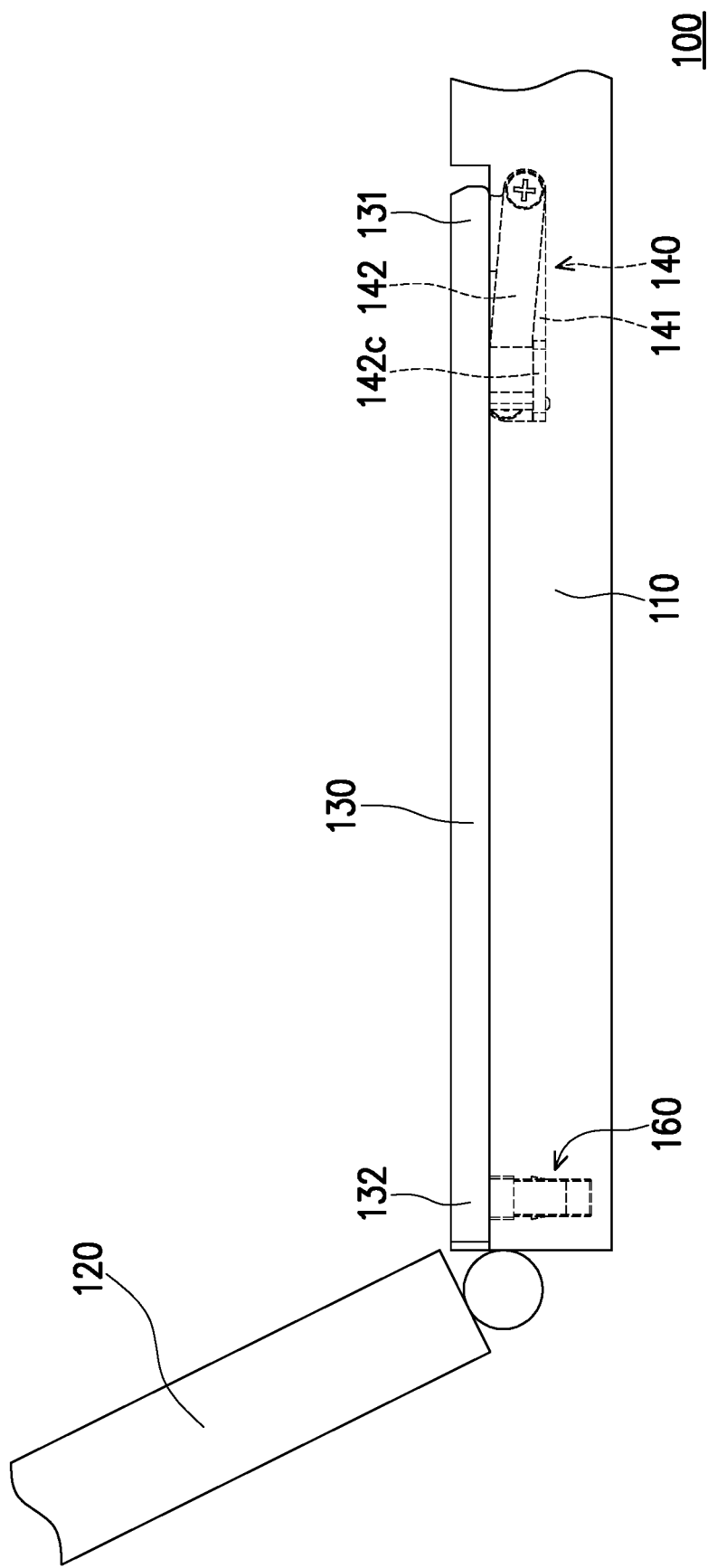
FIG. 2 is a schematic partial side view of an electronic device according to an embodiment of the disclosure.
Figure 3:
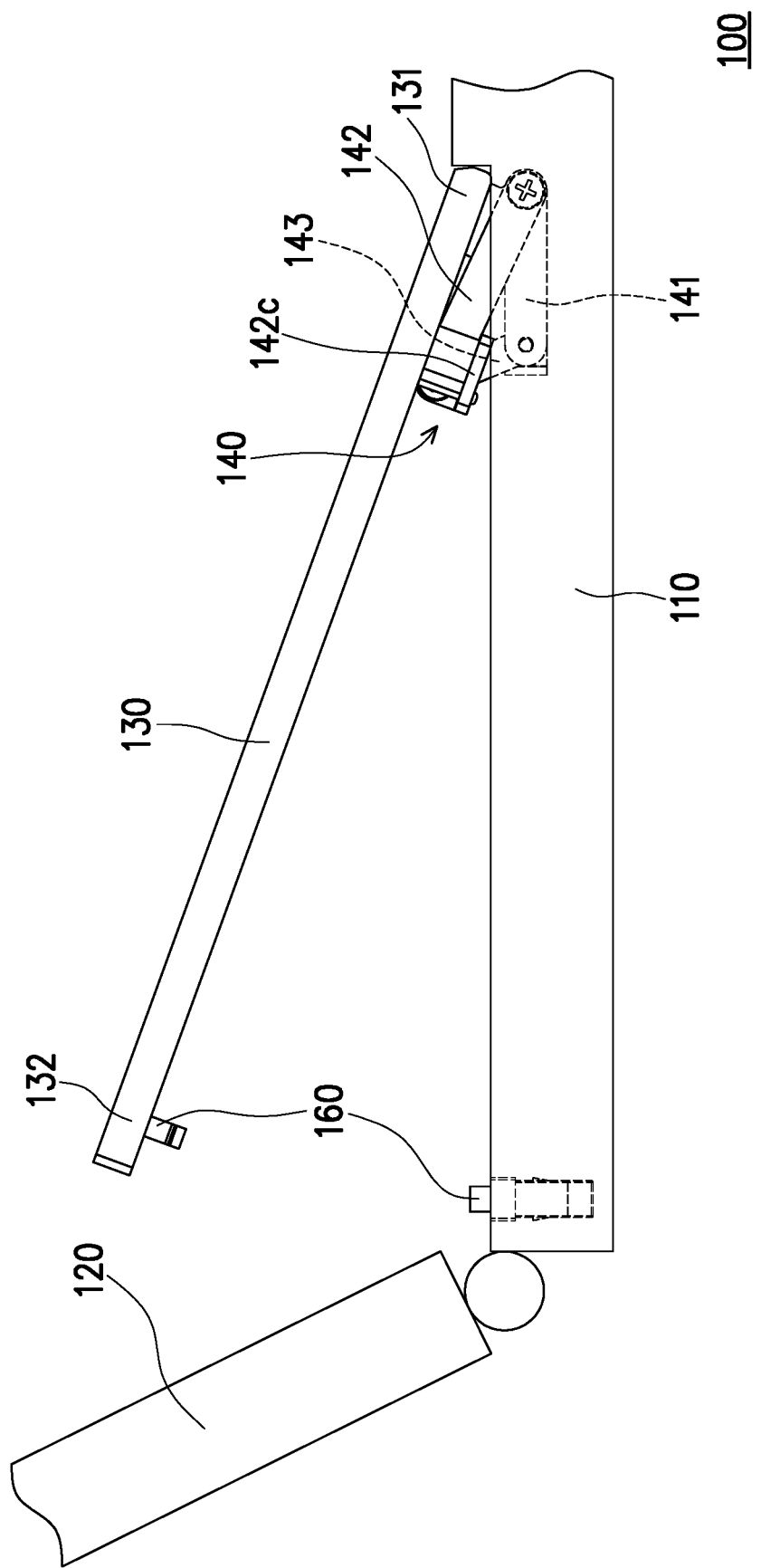
FIG. 3 is a schematic partial side view after an auxiliary display of FIG. 2 is lifted.

FIG. 1 is a schematic top view of an electronic device according to an embodiment of the disclosure. FIG. 2 is a schematic partial side view of an electronic device according to an embodiment of the disclosure. FIG. 3 is a schematic partial side view after an auxiliary display of FIG. 2 is lifted. Referring to FIG. 1 and FIG. 2, in this embodiment, the electronic device 100 may be a notebook computer, and includes a host 110, a main display 120, an auxiliary display 130, a lifting mechanism 140, and a keyboard 150. The host 110 is configured to perform functions such as logic operation, signal control, and data access, and the host display 120 is electrically connected to the host 110. The main display 120 is configured to display a main picture, and is pivoted to the host 110, to switch between an unfolded state and a closed state. Therefore, an unfolded angle of the main display 120 relative to the host 110 is adjustable.

The auxiliary display 130 and the keyboard 150 are electrically connected to the host 110, and are disposed on the host 110 in parallel. The auxiliary display 130 is configured to display an auxiliary picture, and has a touch function, thereby helping improve operation convenience and flexibility of the electronic device 100. The keypad 150 serves as an entity input interface, for a user to input information to the host 110 or operate the host 110. The lifting mechanism 140 is disposed between the auxiliary display 130 and the host 110, and the auxiliary display 130 is connected to the host 110 through the lifting mechanism 140.

In the state shown in FIG. 2, the auxiliary display 130 is not lifted yet, and is accommodated in a groove of the host 110. In the state shown in FIG. 3, the lifting mechanism 140 drives the auxiliary display 130 to rotate and lift relative to the host 110, to adjust the angle and the height of the auxiliary display 130. This not only helps the user operate the auxiliary display 130, but also improves comfort of the user viewing the auxiliary display 130. After the auxiliary display 130 is lifted, the lifting mechanism 140 may be configured to maintain a lifting height of the auxiliary display 130, to improve the reliability of the user operating the auxiliary display 130.

In this embodiment, the lifting mechanism of the auxiliary display 130 is not linked to an unfolding mechanism of the main display 120. That is, the lifting mechanism of the auxiliary display 130 and the unfolding mechanism of the main display 120 run individually and independently. After the main display 120 is unfolded relative to the host 110, the user may actuate the lifting mechanism 140 according to personal requirements, to drive, through the lifting mechanism 140, the auxiliary display 130 to rotate and lift relative to the host 110. Therefore, the electronic device 100 has excellent operation flexibility.

Referring to FIG. 1 to FIG. 3, in this embodiment, the auxiliary display 130 includes a pivoting end 131 close to the keyboard 150 and a lifting end 132 far from the keyboard 150, where the lifting mechanism 140 is disposed corresponding to the pivoting end 131, and is located between the pivoting end 131 and the host 110. On the other hand, the electronic device 100 further includes a push-push mechanism 160, and the push-push mechanism 160 is disposed between the lifting end 132 and the host 110. As shown in FIG. 2, the push-push mechanism 160 locks the lifting end 132 on the host 110, and therefore, the lifting mechanism 140 is not temporarily actuated. When the user presses the lifting end 132 to actuate the push-push mechanism 160, a locking relationship between the lifting end 132 and the host 110 is removed. Once the locking relationship between the lifting end 132 and the host 110 is removed, the lifting mechanism 140 is immediately actuated and drives the pivoting end 131, to lift the lifting end 132, as shown in FIG. 3.

Figure 4A:
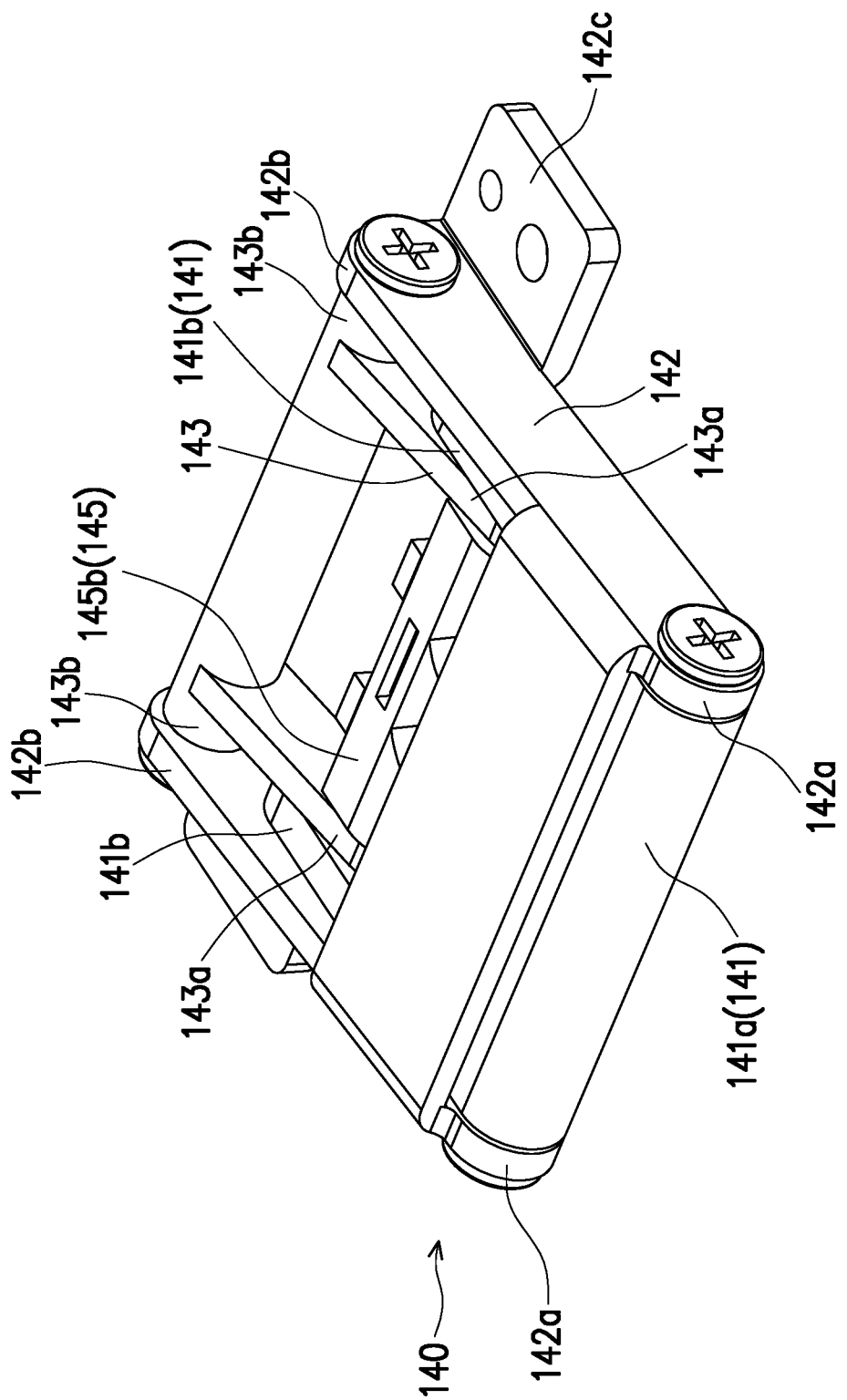
FIG. 4A and FIG. 4B are schematic diagrams of a lifting mechanism before and after actuation according to an embodiment of the disclosure.
Figure 4B:
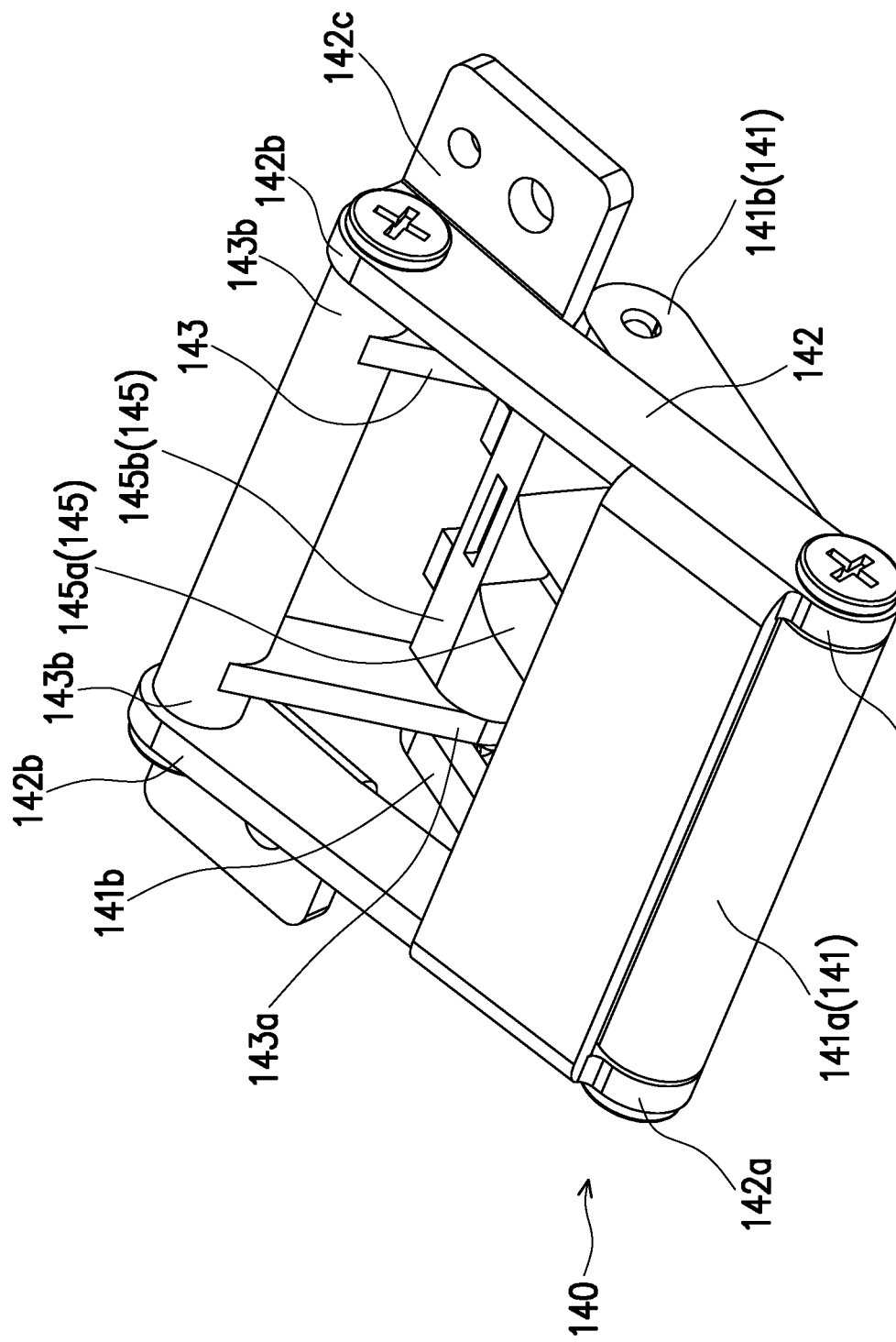
Figure 4D:
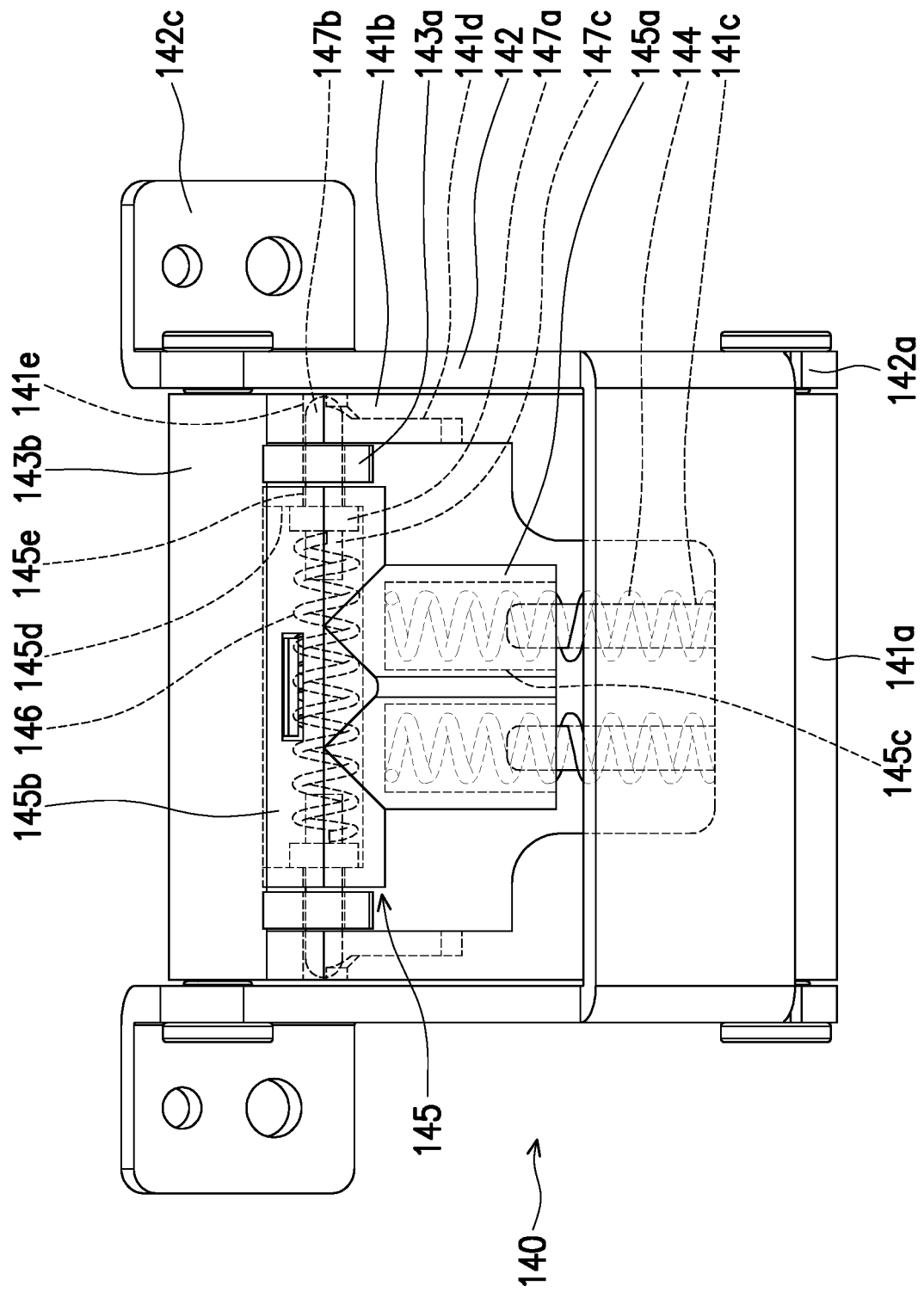
FIG. 4D is a schematic top view of the lifting mechanism of FIG. 4B.

FIG. 4A and FIG. 4B are schematic diagrams of a lifting mechanism before and after actuation according to an embodiment of the disclosure. FIG. 4C is a schematic top view of the lifting mechanism of FIG. 4A. FIG. 4D is a schematic top view of the lifting mechanism of FIG. 4B. Referring to FIG. 2, FIG. 3, FIG. 4A, and FIG. 4B, in this embodiment, the lifting mechanism 140 is composed of at least a first bracket 141, a second bracket 142, and a third bracket 143, and the first bracket 141, the second bracket 142, and the third bracket 143 constitute a linkage group. The first bracket 141 is fixed to the host 110. The second bracket 142 is pivoted to the first bracket 141 and the third bracket 143, and is in contact with the pivoting end 131 of the auxiliary display 130. The third bracket 143 is slidably connected to and pivoted to the first bracket 141. When the third bracket 143 rotates and slides relative to the first bracket 141, the second bracket 142 is driven by the third bracket 143 to rotate relative to the first bracket 141, to lift or sink. In addition, the auxiliary display 130 is driven by the second bracket 142 to rotate relative to the host 110, to lift or sink.

Referring to FIG. 4A to FIG. 4D, the lifting mechanism 140 further includes a first spring 144, and the first spring 144 may use a compression spring. As shown in FIG. 3, the first spring 144 may be configured to provide power required by the second bracket 142 and the third bracket 143 during motion, and provide power required by the auxiliary display 130 during lifting. As shown in FIG. 2, FIG. 4A, and FIG. 4C, when the auxiliary display 130 is locked on the host 110, the first spring 144 is compressed. As shown in FIG. 3, FIG. 4B, and FIG. 4D, when the locking relationship between the auxiliary display 130 and the host 110 is removed, an elastic force of the first spring 144 pushes the third bracket 143, and the second bracket 142 is driven by the third bracket 143 to lift the auxiliary display 130.

As shown in FIG. 3. FIG. 4A, and FIG. 4B, after the third bracket 143 slides to a position, the third bracket 143 is engaged with the first bracket 141, to maintain a lifting state or a lifting height of the second bracket 142 and the auxiliary display 130, thereby preventing the auxiliary display 130 from shaking or sinking due to a force applied to the auxiliary display 130 by the user, and therefore, the auxiliary display has the excellent operation reliability.

Referring to FIG. 2, FIG. 4A, and FIG. 4C, in this embodiment, the first bracket 141 includes a first connecting portion 141a and a second connecting portion 141b relative to the first connecting portion 141a, where the second bracket 142 is pivoted to the first connecting portion 141a, and the third bracket 143 is slidably connected to and pivoted to the second connecting portion 141b.

The second bracket 142 includes a third connecting portion 142a, a fourth connecting portion 142b relative to the third connecting portion 142a, and a fixed connecting portion 142c connected to the fourth connecting portion 142b, where the third connecting portion 142a is pivoted to the first connecting portion 141a of the first bracket 141, and the fourth connecting portion 142b is pivoted to the third bracket 143. The fixed connecting portion 142c of the second bracket 142 is fixed to the pivoting end 131 of the auxiliary display 130, so that the auxiliary display 130 is suitable for being driven by the second bracket 142 to lift or sink. On the other hand, the second bracket 143 includes a fifth connecting portion 143a and a sixth connecting portion 143b relative to the fifth connecting portion 143a, where the fifth connecting portion 143a is pivoted to and slidably connected to the second connecting portion 141b of the first bracket 141, and the sixth connecting portion 143b is pivoted to the fourth connecting portion 142b of the second bracket 142.

As shown in FIG. 2. FIG. 4A, and FIG. 4C, the lifting mechanism 140 further includes a driving member 145, a second spring 146, and a positioning member 147, where the driving member 145 is slidably disposed on the host 110, and two ends of the first spring 144 are in contact with the first bracket 141 and the driving member 145 respectively. Specifically, the driving member 145 is suitable for transferring the elastic force of the first spring 144 to the third bracket 143, so that the third bracket 143 drives the second bracket 142 and the auxiliary display 130 to lift.

In this embodiment, the driving member 145 includes a driving portion 145a and a positioning portion 145b connected to the driving portion 145a, where the two ends of the first spring 144 are in contact with the first connecting portion 141a and the driving portion 145a respectively, and the driving portion 145a is provided with a groove 145c, configured to accommodate a part of the first spring 144. For example, one end of the first spring 144 is in contact with a bottom surface of the groove 145c. On the other hand, the first bracket 141 further includes a convex column 141c protruding from the first connecting portion 141a, where the convex column 141c is inserted into the groove 145c of the driving portion 145a, and the first spring 144 is sleeved on the convex column 141c, to prevent the first spring 144 from being twisted and transformed or separated from between the first connecting portion 141a and the driving portion 145a.

Referring to FIG. 4A to FIG. 4C, the second spring 146 is disposed in the positioning portion 145b, and is perpendicular to the first spring 144. The second spring 146 may use the compression spring. The positioning member 147 is slidably disposed on the positioning portion 145b, and two ends of the positioning member 147 are in contact with the second spring 146 and the second connecting portion 141b respectively. Further, the positioning member 147 is in slidable contact with the second connecting portion 141b, and the second spring 146 provides a corresponding elastic force to the positioning member 147, to ensure that the positioning member 147 abuts against the second connecting portion 141b. On the other hand, the fifth connecting portion 143a of the third bracket 143 is pivoted to the positioning member 147, and is slidably connected to the second connecting portion 141b through the positioning member 147. Therefore, the third bracket 143 has a degree of freedom of motion of sliding and rotating relative to the second connecting portion 141b of the first bracket 141.

Referring to FIG. 4C and FIG. 4D, the positioning portion 145b is provided with a groove 145d and a through hole 145e connected to the groove 145d, and the second spring 146 is disposed in the groove 145d. On the other hand, the positioning member 147 includes a limiting portion 147a, a positioning convex portion 147b connected to the limiting portion 147a, and a convex column 147c connected to the limiting portion 147a, where the limiting portion 147a is slidably disposed in the groove 145d and is in contact with the second spring 146. The positioning convex portion 147b passes through the through hole 145e, where the positioning convex portion 147b is in slidable contact with the second connecting portion 141b, and the fifth connecting portion 143a of the third bracket 143 is pivoted to the positioning convex portion 147b.

Based on a change of a contact point position of the positioning convex portion 147b on the second connecting portion 141b, a length of a part protruding from the through hole 145e of the positioning convex portion 147 changes accordingly, and a position of the limiting portion 147a in the groove 145d changes accordingly, to jointly change a compression amount or a length of the second spring 146.

On the other hand, the limiting portion 147a is located between the convex column 147c and the positioning convex portion 147b, where the convex column 147c is located in the groove 145d, and the second spring 146 is sleeved on the convex column 147c, to prevent the second spring 146 from being twisted and transformed or separated from the positioning member 147. Specifically, the second connecting portion 141b is provided with a sliding slot 141d and a positioning hole 141e connected to the sliding slot 141d, and compared with the positioning hole 141e, the sliding slot 141d is closer to the first connecting portion 141a. That is, the sliding slot 141d is located between the first connecting portion 141a and the positioning hole 141e.

As shown in FIG. 4C and FIG. 4D, the positioning convex portion 147b of the positioning member 147 is slidably disposed in the sliding slot 141d, and the second spring 146 is compressed. When the first spring 144 pushes the driving member 145, the positioning member 147 slides synchronously with the driving member 145, so that the positioning convex portion 147b moves from the sliding slot 141d to the positioning hole 141e, and the elastic force of the second spring 146 pushes the positioning member 147, so that the positioning convex portion 147b is inserted into the positioning hole 141e. In this case, as shown in FIG. 3 and FIG. 4B, the third bracket 143 is engaged with the first bracket 141, to maintain the lifting state or the lifting height of the second bracket 142 and the auxiliary display 130.

Referring to FIG. 4A to FIG. 4D, when the first spring 144 pushes the driving member 145, the positioning member 147 slides synchronously with the driving member 145, and the fifth connecting portion 143a of the third bracket 143 slides synchronously with the positioning member 147. On the other hand, as shown in FIG. 3, the third bracket 143 rotates relative to the positioning member 147, and drives the second bracket 142 through the sixth connecting portion 143b, so that the second bracket 142 rotates relative to the first bracket 141, to lift the auxiliary display 130.

Based on the foregoing, the electronic device of the disclosure integrates the auxiliary display, where the angle and the height of the auxiliary display are adjustable, to help the user operate the auxiliary display, and improve the comfort of the user watching the auxiliary display. In addition, a lifting mechanism of the auxiliary display is not linked to an unfolding mechanism of the main display. That is, the lifting mechanism of the auxiliary display and the unfolding mechanism of the main display run individually and independently. After the main display is unfolded relative to the host, the user may press the auxiliary display according to personal requirements, to actuate the push-push mechanism and remove the locking relationship between the auxiliary display and the main display. Once the locking relationship between the auxiliary display and the host is removed, the lifting mechanism immediately drives the auxiliary display to rotate and lift relative to the host. Therefore, the electronic device has the excellent operation flexibility.

Although the disclosure has been described above through the embodiments, the embodiments are not intended to limit the disclosure. A person of ordinary skill in any art may make some modifications and improvements without departing from the spirit and the scope of the disclosure. Therefore, the protection scope of the disclosure should be subject to the protection scope of the appended claims.

What is claimed is:
1. An electronic device, comprising:
a host;
a main display, pivoted to the host;
an auxiliary display, disposed on the host; and
a lifting mechanism, disposed between the auxiliary display and the host, wherein the auxiliary display is connected to the host through the lifting mechanism, and the lifting mechanism comprises:
a first bracket, fixed to the host;
a driving member, slidably disposed on the host;
a positioning member, slidably disposed on the driving member and in slidably contact with the first bracket;
a second bracket, wherein two ends of the second bracket are respectively pivoted to the first bracket and fixed to the auxiliary display; and
a third bracket, wherein two ends of third bracket are respectively pivoted to the positioning member and the second bracket,
the positioning member slides synchronously with the driving member and pushes the third bracket to rotate, and the third bracket drives the second bracket to rotate relative to the first bracket to lift the auxiliary display.

2. The electronic device according to claim 1, further comprising:
a first spring, wherein two ends of the first spring are respectively in contact with the first bracket and the driving member, and the first bracket is further provided with a sliding slot for the positioning member sliding therein and a positioning hole connected to the sliding slot, the first spring is configured to push the driving member, and the positioning member slides synchronously with the driving member to move from the sliding slot to the positioning hole.

3. The electronic device according to claim 2, wherein the first spring is configured to push the driving member, the positioning member slides synchronously with the driving member while the third bracket rotates relative to the positioning member and drives the second bracket to rotate relative to the first bracket to lift the auxiliary display.

4. The electronic device according to claim 2, wherein the driving member is provided with a groove, and a part of the first spring is located in the groove.

5. The electronic device according to claim 4, wherein the first bracket further comprises a convex column, the convex column is inserted into the groove, and the first spring is sleeved on the convex column.

6. The electronic device according to claim 2, further comprising:
a second spring, disposed in the driving member and in contact with the positioning member, wherein the second spring pushes the positioning member to be inserted into the positioning hole as the positioning member moves to the positioning hole and thus fixing a lifting height of the auxiliary display.

7. The electronic device according to claim 6, wherein the second spring is perpendicular to the first spring.

8. The electronic device according to claim 1, further comprising a keyboard disposed on the host, wherein the keyboard is parallel to the auxiliary display, the auxiliary display comprises a pivoting end close to the keyboard and a lifting end far from the keyboard, and the second bracket is fixed to the pivoting end.

9. The electronic device according to claim 8, further comprising a push-push mechanism, wherein the push-push mechanism is disposed between the lifting end and the host.

10. An electronic device, comprising:
a host;
a main display, pivoted to the host;
an auxiliary display, disposed on the host; and
a lifting mechanism, disposed between the auxiliary display and the host, wherein the lifting mechanism comprises:
a first bracket, fixed to the host;
a second bracket, wherein two ends of the second bracket are respectively pivoted to the first bracket and fixed to the auxiliary display; and
a third bracket, wherein two ends of the third bracket are respectively slidably connected to the first bracket and pivoted to the second bracket,
wherein a lifting height of the auxiliary display varies with one of the two ends of third bracket slidably connected to the first bracket sliding back and forth.

\* \* \* \* \*